INVENTORS.
HIERONYMUS ZYGAN, OTTO KOCH,
HERMANN SCHNELL, ARTHUR PRIETZSCHK,
KURT RÖMLING

INVENTORS.
HIERONYMUS ZYGAN, OTTO KOCH,
HERMANN SCHNELL, ARTHUR PRIETZSCHK,
KURT RÖMLING

ATTORNEY.

March 26, 1968 H. ZYGAN ET AL 3,375,313
PROCESS FOR THE CONTINUOUS BIAXIAL STRETCHING
OF A TRAVELING SHEET
Original Filed Dec. 7, 1960 6 Sheets-Sheet 6

INVENTORS.
HIERONYMUS ZYGAN, OTTO KOCH,
HERMANN SCHNELL, ARTHUR PRIETZSCHK,
KURT RÖMLING

BY

ATTORNEY.

United States Patent Office 3,375,313
Patented Mar. 26, 1968

3,375,313
PROCESS FOR THE CONTINUOUS BIAXIAL
STRETCHING OF A TRAVELING SHEET
Hieronymus Zygan and Otto Koch, Leverkusen, Hermann Schnell, Krefeld-Urdingen, Arthur Prietzschk, Dormagen, and Kurt Römling, Leverkusen, Germany, assignors to Farbenfabriken Bayer Aktiengesellschaft, Leverkusen, Germany, a corporation of Germany
Continuation-in-part of application Ser. No. 259,474, Jan. 25, 1963, which is a division of application Ser. No. 74,715, Dec. 7, 1960, now Patent No. 3,114,929, dated Dec. 24, 1963. This application Oct. 21, 1965, Ser. No. 505,598
Claims priority, application Germany, Dec. 12, 1959, F 30,071
3 Claims. (Cl. 264—289)

ABSTRACT OF THE DISCLOSURE

A sheet is passed through independently controlled holding devices which are in spaced relationship to one another and aligned on opposite sides of the sheet and independent of the other pairs of holding devices at each end of the sheet. The independently controlled holding devices are independently operated to independently control the force and distance between each pair of opposing holding devices to correspondingly control the tension on the sheet in the transverse direction while the sheet is being stretched in the longitudinal direction.

---

Figure 1A:
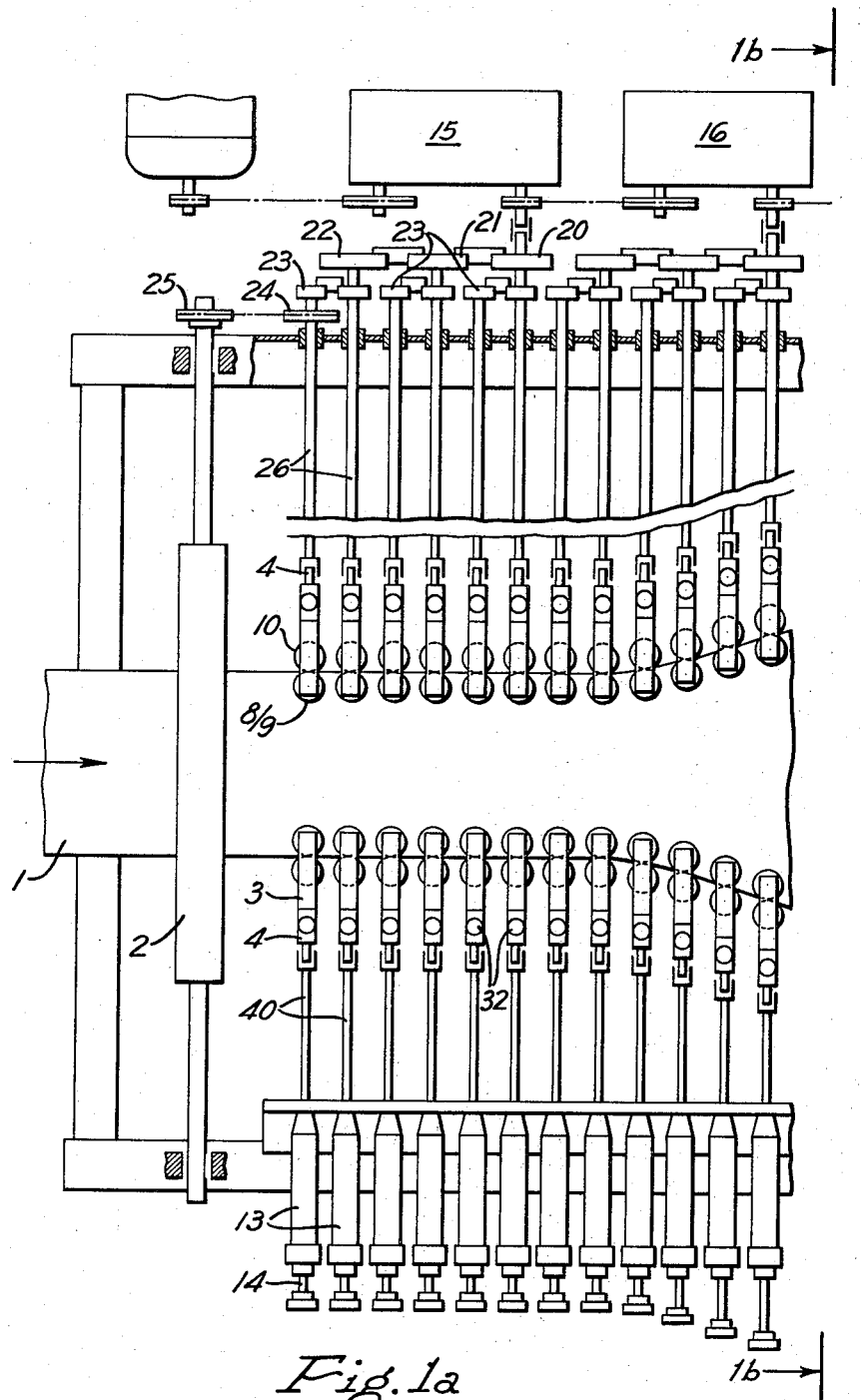

This application is a continuation-in-part of application Ser. No. 259,474 filed Jan. 25, 1963 and now abandoned, which application is a division of application Ser. No. 74,715 filed Dec. 7, 1960, now U.S. Patent No. 3,114,929.

This invention relates to the manufacture of plastic foil webs and more particularly to a process for simultaneously biaxially stretching a continuously traveling foil web.

It has been heretofore known to simultaneously biaxially stretch continuous traveling foil webs of thermoplastic materials. In some of these prior art processes the foil web is clamped on both sides of its margins by means of traveling holding devices, for example, clips, which are moved by chains, ropes, screw spindles or the like or by the foil itself in longitudinal direction along guide means. It is possible to use a foil with or without marginally thickened portions. All the aforesaid prior art means having movable holding devices do not permit individual adjustments at any stage during longitudinal and/or transverse stretching independently of one another or independently of one another at the individual holding devices, since the movable holding devices are guided, at least partially, along means having either fixed curvatures from the beginning or along straight lines. If other curvatures are desired, they can only be achieved by exchanging the aforesaid means.

Other previously known processes make use of fixedly mounted holding devices which are aligned on both sides of the foil margins on movable rails or racks; the holding devices engage the edges of the foil which pass therebetween. Holding devices of the aforesaid kind are preferably designed as guide bars or wheel sets. In the latter case the individual wheels are either driven or are permitted to run idle.

All the aforesaid prior art means with fixedly mounted holding devices also suffer from the disadvantage that they do not allow to adjust any intermediate stage of longitudinal and/or transverse stretching at a given holding device independently of one another or independently of the intermediate stages at the other individual holding devices, due to the fact that more than two holding devices are mounted along a straight line or a fixedly curved line, which is predetermined from the beginning, or since the fixedly mounted holding devices are wheel sets, which are inclined in such a manner in the longitudinal direction of the foil to couple both the longitudinal stretch between two adjacent wheel sets and the transversal stretch between each single wheel set on opposite sides of the foil. The inclined wheel sets have another serious disadvantage in that the inclination of the wheel sets must be so chosen that the foil is firmly gripped on its edges.

Another disadvantage of the known stretching processes resides in the fact that owing to the use of chains, ropes and the like, with traveling holding devices or owing to the arrangement of several stationary holding devices along one and the same rail, the transverse force acting on the foil at each holding device cannot be individually controlled. Consequently, only some average value can be obtained. Thus, maximum forces occur on individual holding devices as a result of an adverse course of the stretching operation, which forces may cause breaking of the foil, while the tensile strength of the foil is not fully utilized at other holding devices.

Thus, when working by these methods, the importance of the course of the stretching process as a function of time between initial and final conditions of the film, i.e. the kinematics of the stretching procedure, is not sufficiently taken into account. Although the final increase in the width and length of the foil web which results from the entire stretching process is adjustable in each of the apparatus of the prior art, the kinematic of the stretching procedure in each of the known apparatus are nevertheless substantially fixed; it is practically impossible to achieve every desired variation between the course of longitudinal and transverse stretching as a function of time or every desired interrelationship therebetween. It can readily be seen that the foil web can be stretched to produce the desired satisfactory results only if the kinematics of the stretching process which are established beforehand correspond to the actual structure of the apparatus used to carry out the process. This in most cases is not entirely the case and, therefore, the properties of the resulting stretched foil web are not at their optimum value.

It is, therefore, an object of this invention to provide an improved process for biaxially stretching a continuously traveling foil web. It is still another object of this invention to provide an improved method for biaxially orienting thermoplastic foil webs.

Since in the biaxial stretching operation the final stretching ratios of the foil web in both the longitudinal and transverse directions and the period of time for the entire stretching operation can be varied by various means as a function of time between initial and final conditions, it is necessary, when one is working according to a physically completely defined method, to predetermine both the final stretching ratios in both directions and the course of the two stretching processes in longitudinal and transverse direction as a function of time in all parameters establishing it. Since in the stretching of traveling foil webs the course of longitudinal stretching is determined by the dependence of the longitudinal component on the velocity of the foil upon the point in the stretching zone and the course of transverse stretching by the course of the marginal limiting curve in the stretching zone, these two components must be adjustable, individually and independently of one another, at any stage of the longitudinal stretching and transverse stretching, as well as upon any combination of the two components of the longitudinal and transverse stretching in order to achieve the desired result from the biaxial stretching process as a whole.

The foregoing objects and others which will become apparent from the following description taken in conjunction with the accompanying drawings are accomplished in accordance with the invention, generally speaking, by providing an apparatus and a method for simultaneously biaxially stretching thermoplastic foil webs having marginally reinforced thickened portions which include a plurality of separate holding devices on each side of the foil web which engage the marginal thickened portions, each of said holding devices has a means for independently regulating the longitudinal speed at the margin of the web and also a means for regulating the distance of the corresponding holding devices, and the force acting on each of said holding devices, actually facing each other, on either side of the foil web, independently of the other pairs of corresponding holding devices, to cause the stretching of the foil web in the transverse direction. Thus, the invention contemplates both the method and apparatus for producing a biaxially oriented foil web having reproducible properties through the entire length and width of the web by continuously controlling the marginal velocity at discrete points along the path of the foil web through the apparatus while at the same time, controlling the amount of transverse stretching and the force at each point along the length of the web within the apparatus by controlling the distance separating opposing holding devices on either side of the foil web. The combination of a pair of input and output rollers whose peripheral speeds are independently regulated and the holding devices move the film longitudinally, thus, providing a completely defined area having an arbitrarily selective marginal speed and at the same time providing for completely independent transverse stretching of the film in the stretching apparatus, at that moment being subjected to stretching, this being independent of the final dimensions of the foil webs after the stretching. That is, by this method and apparatus, it is possible to achieve on the entire surface of the foil web any desired kinematics of the stretching operation and, more especially, those kinematics which are most suitable for the purpose actually required.

Figure 1B:
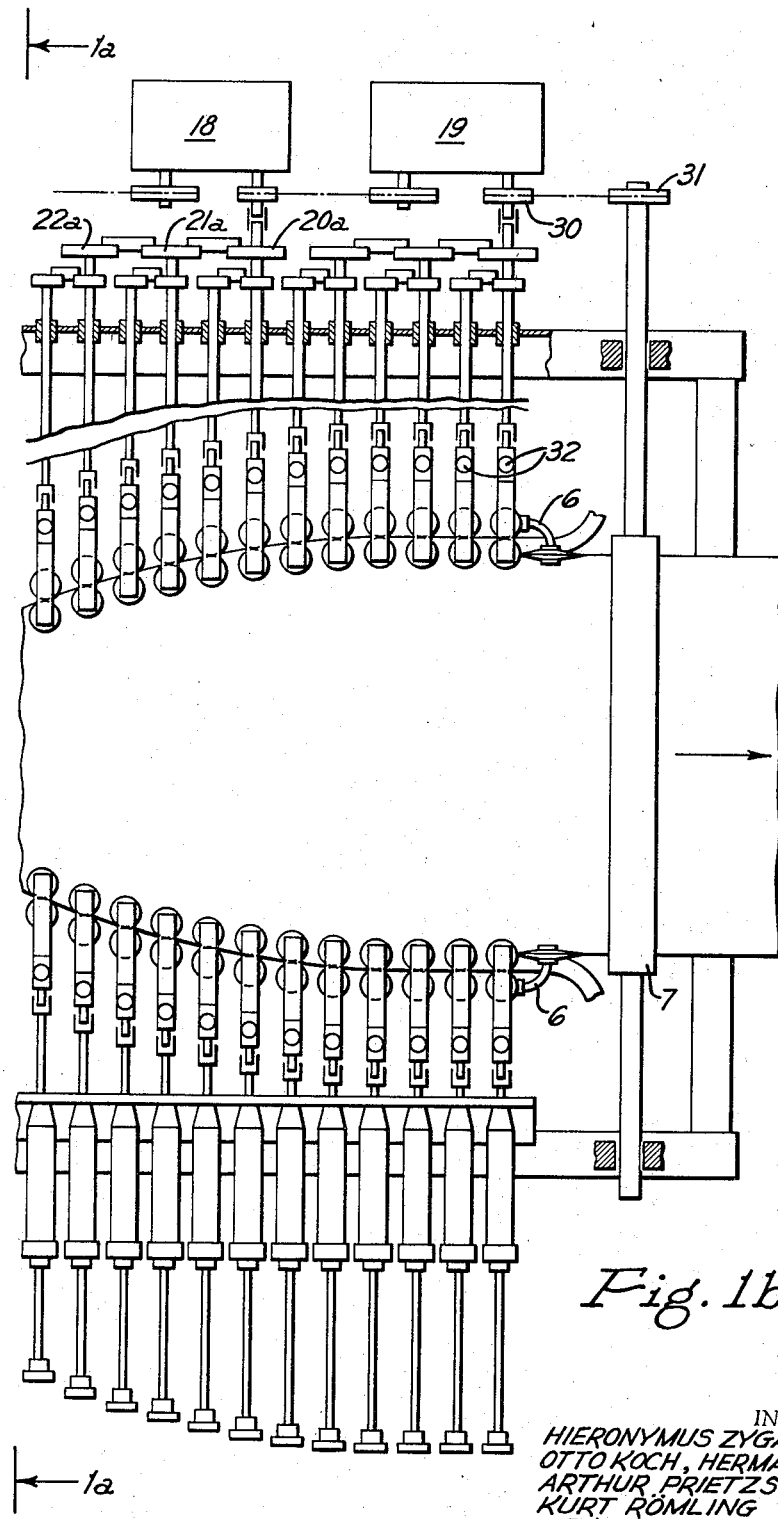
Figure 2A:
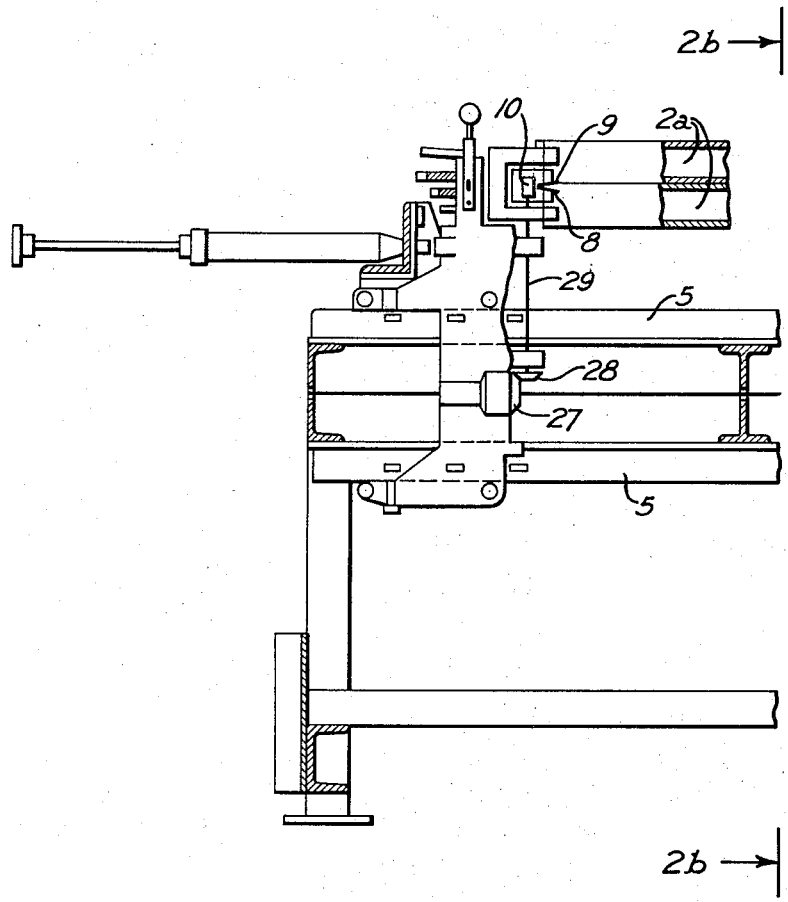
Figure 2B:
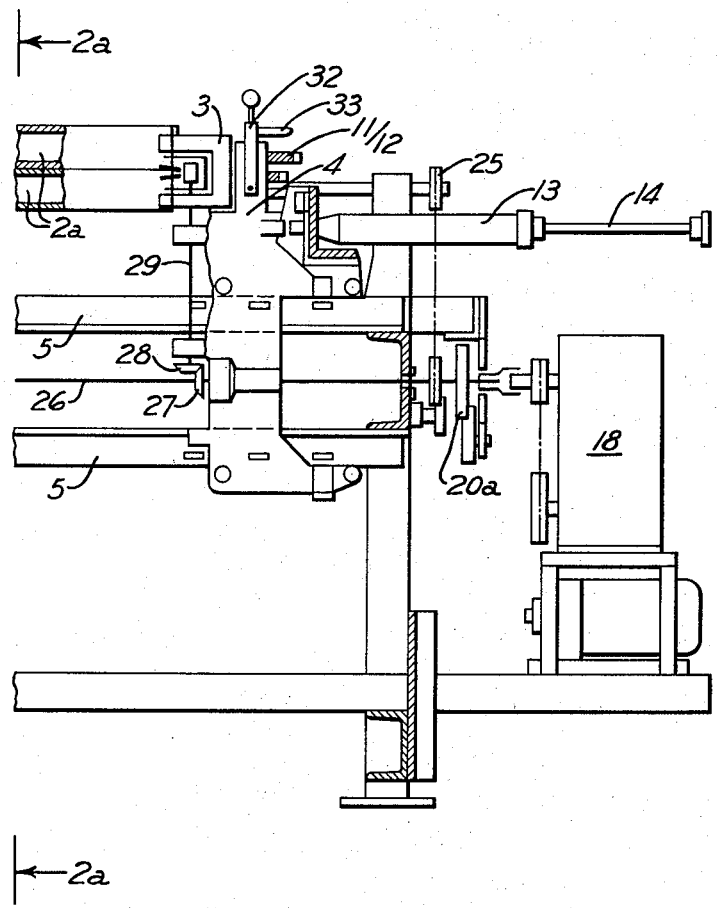

The process and apparatus of this invention will become more apparent in conjunction with the accompanying drawings in which like reference characters indicate like reference parts and in which:

FIGURE 1a is a plan view of the left hand side of the stretching apparatus in accordance with this invention, FIGURE 1b is a plan view of the right hand side of the stretching apparatus in accordance with this invention, FIGURE 2a is a sectional view of FIGURE 1a taken transversely of the direction of movement of the foil web and of the portion to the left of the center line of the foil web, FIGURE 2b is a sectional view of FIGURE 1b taken transversely of the direction of movement of the foil web and of the portion to the right of the center line of the foil web.

Figure 3A:
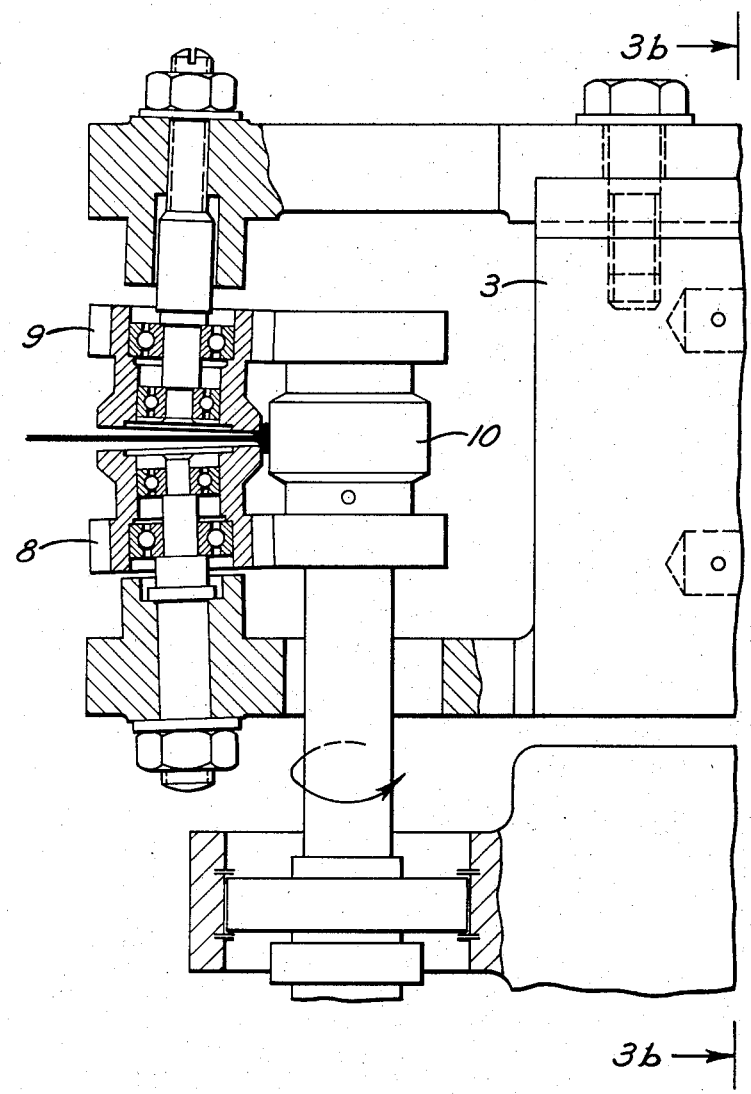
Figure 3B:
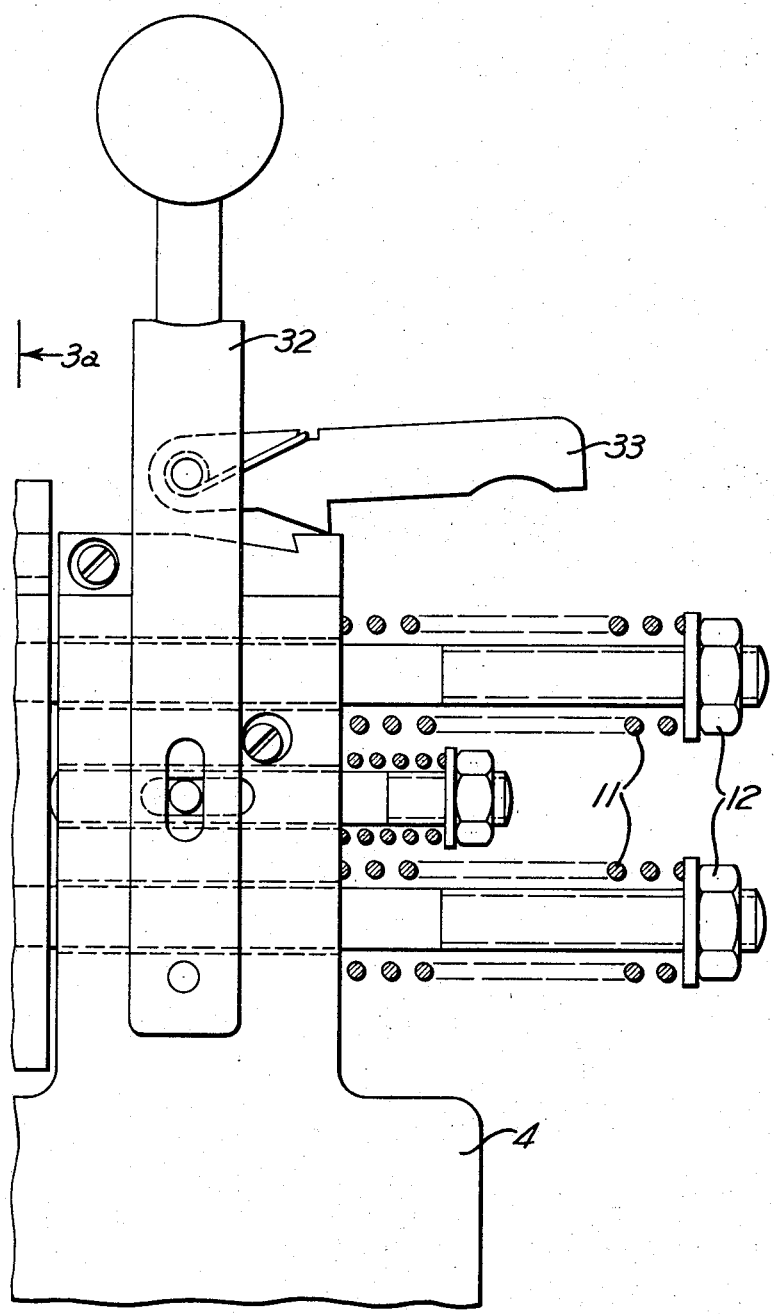

FIGURE 3a is a sectional view through the holding devices in accordance with this invention, and FIGURE 3b is a view of the mechanism which permits the transverse movement of the holding device shown in FIGURE 3a.

As stated, above, the holding devices are each provided with a means for independently regulating the marginal speed of the foil web in the longitudinal direction and also with a means for displacing the holding devices transversely of the direction of travel of the web, and for controlling the force exerted on said holding devices, which is also independently regulated with respect to the other holding devices. With particular respect to the drawings, FIGURES 1a and 1b illustrate the path taken by the foil web through the apparatus in accordance with this invention which stretches the foil web simultaneously both longitudinally and transversely. The foil web 1 which has marginally reinforced thickened portions and which may come either directly from an extruding device or from storage rollers is introduced through a pair of inlet or feed rollers 2 into the stretching apparatus. In order to insure that the marginally thickened portions or beads of the web are not crushed, the inlet rollers have a suitable rubber covering 2a as shown in FIGURES 2a and 2b. The web after passing through said rollers 2 is taken up by a plurality of holding devices 3 which engage the marginally thickened portions in the manner illustrated in FIGURE 3a. The plurality of holding devices 3 are mounted on a plurality of carriages 4 which are movable along rails 5 arranged transversely of the direction of movement of the foil. Each holding device 3 which is connected to a movable carriage 4 is connected by means of a rod 40 to a fixed pressure cylinder 13. There is one pressure cylinder for each holding device carriage combination. The maximum movement of each holding device 3 in the transverse direction is limited by an adjustable stud 14. Of course, the holding devices 3 do not move in the longitudinal direction but cause the movement of the foil by rotation. Further, by adjustment of the pressure within each of the cylinders 13, for example, by means of a reducing valve (not shown), it is possible to control the transverse displacement of each holding device 3 by the force exerted on the carriage 4 due to the pressure within the cylinder 13. This force exerted on the carriage 4 can be determined in advance and is independent of the position of the carriage.

It can therefore be readily seen that the transverse stretching at any particular point along the length of the foil web is controlled by the transverse distance between corresponding holding devices disposed immediately opposite each other on either side of the web.

Fixed to the last holder device immediately before the output rollers 7 is a knife or cutter device 6 which severs the marginal bead from the foil. The foil may then be stored on a wind-up roll as is well known in the art. The marginal portion may then be returned to the extruding device or other apparatus for preparing the foil and reworked into a foil.

With respect to the manner by which the marginal thickened portion of the foil web is held by the holding device, FIGURES 3a and 3b illustrate the carriage 4 which is provided with a bearing having journaled therein a shaft to which is directly coupled driving wheel 10. Wheel 10 has connected thereto gears which engage teeth provided on driven wheels 8 and 9. Wheels 8 and 9 are positioned at a slight angle with respect to the plane of wheel 10. In the initial position, that is, when the foil web is first introduced through the feed rollers 2, the wheels 8 and 9 are held away from wheel 10 by action of the lever arm 32 and a detent 33 whereby the marginally reinforced portion is fed between the wheels 8, 9 and 10. The lever arm 32 is then moved away from the margin of the foil, thus moving wheels 8 and 9 toward wheel 10 tightly engaging the reinforced thickened portion therebetween and preventing any slippage of the marginal reinforced portion from the wheel 10. In order to guarantee a reliable driving action even where there is a relatively large ratio between the speeds of adjacent holder device, springs 11 are provided which in conjunction with adjustable nuts 12, control the force that wheels 8 and 9 grip the marginal thickened portion and thereby hold it tightly against wheel 10. It can, thus, be seen that the holding device 3 not only positions marginally reinforced thickened portions transversely of the direction of travel by movement of the carriage 4, but also imparts longitudinal motion to the foil web due to the driving action of the wheel sets 8, 9 and 10.

The longitudinal stretching of the foil, which is accomplished simultaneously with the transverse stretching, is achieved by cooperation of the speed ratio of the inlet and outlet rollers and of the separate holding devices. The drive for the wheel sets 8, 9 and 10 belonging to each of the individual holding devices 3 is subdivided into several groups. That is, for example, five wheels sets may belong to each group. The speeds of the individual groups composed of the five wheel sets can be altered by means of regulating gears 15, 16, 18 and 19 without shutting down the stretching apparatus while the foil is continually passed therethrough. Each of the individual wheel sets 8, 9 and 10 are connected through gear trains to one of the regulating gears 15, 16, 18 and 19. Each gear train is composed of gear wheels 20, 21, 22 and 23. Thus, the speed of rotation of each wheel set 8, 9 and 10 can be altered by changing the size of one or more of the gears 20, 21, 22 and 23, of the gear train. The peripheral speed of the pair of feed rollers 2 is determined by the first regulating gear 15, gear wheels 20, 21, 22 and 23 of the first group which are connected to regulating gear 15 and sprocket wheels 24 and 25. As shown in FIGURE 1a, the first regulating gear 15 is connected to a motor with the remaining regulating gears connected in series with regulating gear 15. The last regulating gear 19 is provided with a sprocket wheel 30 to drive the output rollers 7 by means of a connection through sprocket wheel 31. The wheel sets 8, 9 and 10 are driven by a shaft 26 which has a longitudinal groove or keyway and on which is mounted a beveled gear 27. Gear 27 is freely displaceable in the groove which permits the movement thereof to mesh with another beveled gear 28 independently of the position of carriage 4 along the transverse rail 5. The beveled gear 28 is mounted on a shaft 29 which is journaled in bearings provided on the carriage 4. The other end of shaft 29 carries the driving gear 10 of the associated wheel sets 8, 9 and 10. In this way, the rotational movement is transmitted to the holding devices 3 without thereby producing a force component in the direction of the free movement of the carriages. The wheel sets 8, 9 and 10 can, thus, be independently controlled with respect to the peripheral speed thereof, so if desired, every pair of wheel sets in the entire apparatus could have a different speed depending upon the kinematics of the particular stretching operation desired. For example, each succeeding wheel set can have a slightly greater peripheral speed, thus, causing the longitudinal stretching to take place in small increments.

The stretching of the foil thus takes place between the pairs of inlet feed rollers 2 and outlet rollers 7. The area between these rollers where the baxial stretching takes place is provided with any suitable heating means (not shown) known in the art, such as, for example, heated air, electric resistance heaters, gas-type heaters in the form of burners disposed beneath the foil, pipes carrying a heated liquid, such as, oil, infra-red heaters, such as, lamps and the like.

An essential advantage which results from the connection in series of the regulating gear is that the adjustment of any desired regulating gear alters only the speed ratio and therefore the stretching ratio in the longitudinal direction within the associated range. That is, by altering the regulating gears, the speeds of the holding devices which are connected to that particular regulating gear by the gear train, are altered. Of equal importance is the fact that no undesirable folding of the foil between two holding devices 3 can result by increasing the speed ratio of neighboring holding devices, because the peripheral speed of all following wheel sets 8, 9 and 10, seen in the direction of travel of the foil are automatically increased.

The process and apparatus of this invention is suitable for orienting all types of thermoplastic films, such as, cellulose, esters, regenerated cellulose, polyvinyl and polyvinylidene-type resins, nylon, rubber hydrochloride, polycarbonates, polyethylene, and polystyrene films and other elastomeric or thermoplastic resins. The process and apparatus of this invention are particularly suitable for orienting polycarbonate films and foils because the amount of force both longitudinally and transversely of the direction of travel of the film at any given point on the film can be closely controlled. Temperatures between the feed rollers and the output rollers should be controlled within the range of from about 10° C. to about 180° C.

Although the invention has been described in considerable detail for the purpose of illustration, it is to be understood that variations may be made therein by those skilled in the art without departing from the spirit of the invention and the scope of the claims.

What is claimed is:

1. A method for biaxially stretching a continuous traveling thermoplastic film which comprises passing said film through independently controlled holding devices, said holding devices being in spaced relationship to each other and aligned on opposite sides of said film independent of the other pairs of holding devices, independently controlling the speed of the adjacent holding devices to correspondingly control the partial stretch ratio in the longitudinal direction between adjacent holding devices of said film passing therethrough, and independently controlling the force and distance between each pair of opposing holding devices positioned on opposite sides of said traveling film to correspondingly control the tension on said film in the transverse direction and the amount of transverse stretch achieved by each pair of opposing holding devices.

2. A method for biaxially stretching a continuous traveling thermoplastic film which comprises passing said film through independently controlled holding devices, said holding devices being in spaced relationship to each other and aligned on opposite sides of said film independent of the other pairs of holding devices, independently controlling the speed of the adjacent holding devices to correspondingly control the partial stretch ratio in the longitudinal direction between adjacent holding devices of said film passing therethrough, and independently controlling the force and distance between each pair of opposing holding devices positioned on opposite sides of said traveling film to correspondingly control the tension on said film in the transverse direction and the amount of transverse stretch achieved by each pair of opposing holding devices and heating said film throughout the stretching operation.

3. A method for biaxially stretching a continuous traveling thermoplastic film which comprises passing said film through independently controlled holding devices, said holding devices being in spaced relationship to each other and aligned on opposite sides of said film independent of the other pairs of holding devices, independently controlling the speed of the adjacent holding devices to correspondingly control the partial stretch ratio in the longitudinal direction between adjacent holding devices of said film passing therethrough, and independently controlling the force and distance between each pair of opposing holding devices positioned on opposite sides of said traveling film to correspondingly control the tension on said film in the transverse direction and the amount of transverse stretch achieved by each pair of opposing holding devices and heating said film to a temperature of from about 10° C. to about 180° C. throughout said stretching operation.

References Cited

UNITED STATES PATENTS

| 1,280,139 | 10/1918 | Bolin. |
| 2,034,716 | 3/1936 | Dreytus. |
| 2,618,112 | 11/1952 | Milne. |
| 2,778,057 | 1/1957 | Clark. |

ALEXANDER H. BRODMERKEL, *Primary Examiner.*

DONALD J. ARNOLD, *Examiner.*

J. H. WOO, *Assistant Examiner.*